US011637366B2

(12) United States Patent
Sakurai et al.

(10) Patent No.: US 11,637,366 B2
(45) Date of Patent: Apr. 25, 2023

(54) COVER MEMBER HAVING PLURALITY OF FACES, AND RADAR APPARATUS PROVIDED WITH THE COVER MEMBER

(71) Applicant: DENSO CORPORATION, Kariya (JP)

(72) Inventors: Kazumasa Sakurai, Nisshin (JP); Yuji Sugimoto, Nisshin (JP); Kazushi Kawaguchi, Nisshin (JP); Asahi Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/888,275

(22) Filed: May 29, 2020

(65) Prior Publication Data

US 2020/0295451 A1    Sep. 17, 2020

Related U.S. Application Data

(63) Continuation of application No. 15/539,611, filed as application No. PCT/JP2015/085963 on Dec. 24, 2015.

(30) Foreign Application Priority Data

Dec. 26, 2014 (JP) ................................. 2014-266099

(51) Int. Cl.
*H01Q 1/42* (2006.01)
*G01S 7/02* (2006.01)
*G01S 7/03* (2006.01)
*H01Q 1/32* (2006.01)
*G01S 13/931* (2020.01)

(52) U.S. Cl.
CPC ................. *H01Q 1/42* (2013.01); *G01S 7/02* (2013.01); *G01S 7/03* (2013.01); *G01S 13/931* (2013.01); *H01Q 1/3233* (2013.01); *H01Q 1/3283* (2013.01); *G01S 7/027* (2021.05)

(58) Field of Classification Search
CPC .................................... G01S 7/02; H01Q 1/42
See application file for complete search history.

(56) References Cited

U.S. PATENT DOCUMENTS 6,501,415 B1*   12/2002   Viana ..................... H01Q 25/00
                                                        342/27
9,024,804 B2*    5/2015   Shi ....................... H01Q 1/3291
                                                        342/55
2002/0067305 A1*  6/2002   LeBlanc ................ H01Q 13/18
                                                        342/198

(Continued)

FOREIGN PATENT DOCUMENTS

JP       S6485404 A      3/1989
JP       H03-10407       1/1991

(Continued)

*Primary Examiner* — Marcus E Windrich
(74) *Attorney, Agent, or Firm* — Maschoff Brennan (57) ABSTRACT

A radar apparatus includes transmitting means, receiving means, target detection means, and a cover member. The cover member is positioned opposite at least one of the transmitting means and the receiving means, such as to cover at least one of the transmitting means and the receiving means. The cover member is provided with a first face which is positioned opposite at least one of the transmitting means and the receiving means, and a second face which is on an opposite side from the first face and is not parallel to the first face.

14 Claims, 6 Drawing Sheets

(56) References Cited

U.S. PATENT DOCUMENTS

| | | | |
|---|---|---|---|
| 2009/0140912 A1* | 6/2009 | Kato | G01S 7/4026 342/70 |
| 2009/0146865 A1* | 6/2009 | Watanabe | G01S 13/931 342/27 |
| 2009/0213019 A1* | 8/2009 | Schoebel | H01Q 1/42 343/711 |
| 2010/0039346 A1* | 2/2010 | Peter | H01Q 21/06 343/872 |
| 2013/0214988 A1* | 8/2013 | Brady | H01Q 15/0013 343/872 |
| 2014/0091969 A1* | 4/2014 | Shi | G01S 7/03 342/385 |
| 2017/0301982 A1* | 10/2017 | Ohtake | H01Q 1/3233 |
| 2017/0324157 A1* | 11/2017 | Shurish | H01Q 1/44 |
| 2018/0013196 A1 | 1/2018 | Sakurai et al. | |

FOREIGN PATENT DOCUMENTS

| | | |
|---|---|---|
| JP | 2000-174543 A | 6/2000 |
| JP | 2005-337759 A | 12/2005 |
| JP | 2006-145399 A | 6/2006 |
| JP | 2007-331608 A | 12/2007 |

* cited by examiner

COVER MEMBER HAVING PLURALITY OF FACES, AND RADAR APPARATUS PROVIDED WITH THE COVER MEMBER

CROSS-REFERENCE TO RELATED APPLICATION

This application is a continuation application of U.S. patent application Ser. No. 15/539,611, filed Dec. 24, 2015, which is based on and claims the benefit of priority from earlier Japanese Patent Application No. 2014-266099 filed 10 Dec. 26, 2014, the descriptions of which are incorporated herein by reference.

BACKGROUND OF THE INVENTION

Technical Field

The present disclosure relates to a radar apparatus, and to a cover member used in the radar apparatus.

Background Art

Radar apparatuses are known which transmit and receive probe waves, and, based on the results, detect targets which reflected the probe waves. For example a radar apparatus is disclosed in Japan Patent Publication No. 2009-103456, in which a cover member is provided which is disposed opposite a transmitting and receiving face for the probe waves, such as to cover the probe wave transmitting and receiving face.

Furthermore, the cover member described in the above patent document is in the form of a plate having faces that are parallel to one another, and are disposed at a prescribed angle of inclination (3 degrees) with respect to the probe wave transmitting and receiving face

PRIOR ART LITERATURE

Patent Literature

[PTL 1] Japan Patent Publication No. 2009-103456

Generally, a cover member is formed of a material that is permeable to the probe waves, however part of the probe waves are reflected by the cover member. That is to say, with such a cover member, the probe waves are reflected at both a first face of the cover member, which is opposite the probe wave transmitting and receiving face, and at a second face, which is on an opposite side from the first face.

With the cover member that is described in Japan Patent Publication No. 2009-103456, since the first face and the second face are formed parallel to one another, the reflected waves from the first face and the reflected waves from the second face are oriented in the same direction. Reflected waves that are oriented in the same direction ((referred to in the following as reflection noise) may strengthen each other. If such strengthened reflection noise is oriented towards the probe wave transmitting and receiving face, and is reflected from the probe wave transmitting and receiving face, then it is possible that this may interfere with the probe waves transmitted by the radar apparatus itself, and result in a lowering of the accuracy of the radar apparatus in detecting targets.

That is to say, with the prior art technology, reflection noise can readily have large effects.

SUMMARY

The present disclosure provides a radar apparatus whereby the effects of interference due to reflection noise are reduced.

One aspect of the present disclosure relates to a radar apparatus (1, 3) having transmitting means (12), receiving means (14), target detection means (10, 16, 18), and a cover member (20, 50).

The transmitting means transmits probe waves. The receiving means receives incoming waves. The target detection means detects targets that are sources of the incoming waves, based on the results of transmitting the probe waves by the transmitting means and receiving the incoming waves by the receiving means.

The cover member is disposed opposite at least one of the transmitting means and the receiving means such so as to cover at least one of the transmitting means and receiving means. The cover member has a first face (26, 56) and a second face (28, 58).

The first face is disposed opposite at least one of the transmitting means and the receiving means. The second face is on an opposite side from the first face, and is not parallel to the first face.

With such a cover member, since the first face and the second face are not parallel to one another, a lessening can be achieved of a condition whereby first reflected waves that are reflected at the first face and second reflected waves that are reflected at the second face are oriented in the same direction.

As a result, a decrease can be achieved in the condition whereby the first reflected waves and the second reflected waves become strengthened and interfere with the probe waves transmitted by the radar apparatus. That is to say, with a radar apparatus according to the present disclosure, the effects of interference due to reflection noise can be reduced.

Furthermore, with a radar apparatus according to the present disclosure, lowering of the accuracy of detecting targets can be lessened.

One aspect of the present disclosure is a cover member used in a radar apparatus.

The signs shown in parentheses in the "Claims" and in the "Solution to Problem" indicate a relationship to means specified in embodiments that are described hereinafter as modes, and do not limit the technical scope of the disclosure.

DESCRIPTION OF EMBODIMENTS

Embodiments of the disclosure are described in the following referring to the drawings.

First Embodiment (Radar Apparatus)

Figure 1:
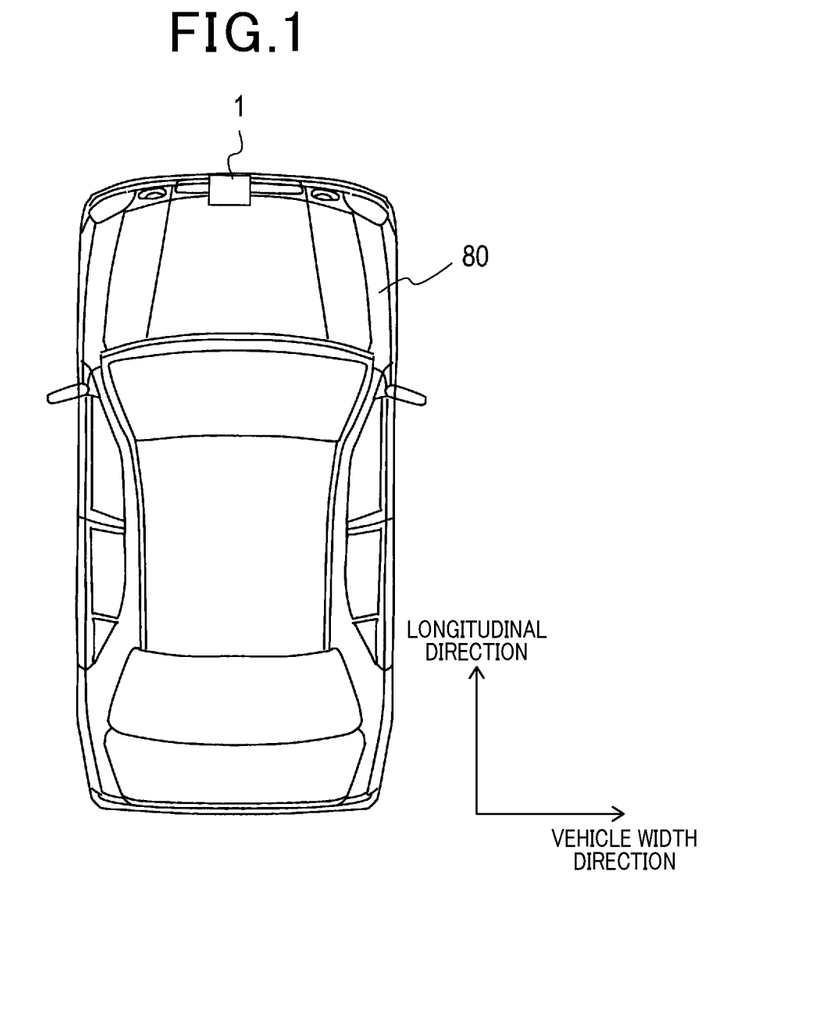
FIG. 1 is an explanatory diagram showing the installation location of a radar apparatus according to embodiments of the present disclosure, in a vehicle.

As shown in FIG. 1, a radar apparatus 1 is installed in a forward part (for example, a front grille) of a 4-wheeled vehicle 80.

The radar apparatus 1 transmits probe waves (radar waves) which are electromagnetic waves in the millimeter-waves band, receives incoming waves which are reflected waves of the probe waves, and detects respective targets that have reflected the probe waves, based on the reception result.

The term "target" as used herein refers to a source of the incoming waves, including objects which are on the road and buildings which are around the road. Such objects can include, for example automobiles, roadside objects, traffic lights, pedestrians, etc.

Figure 2:
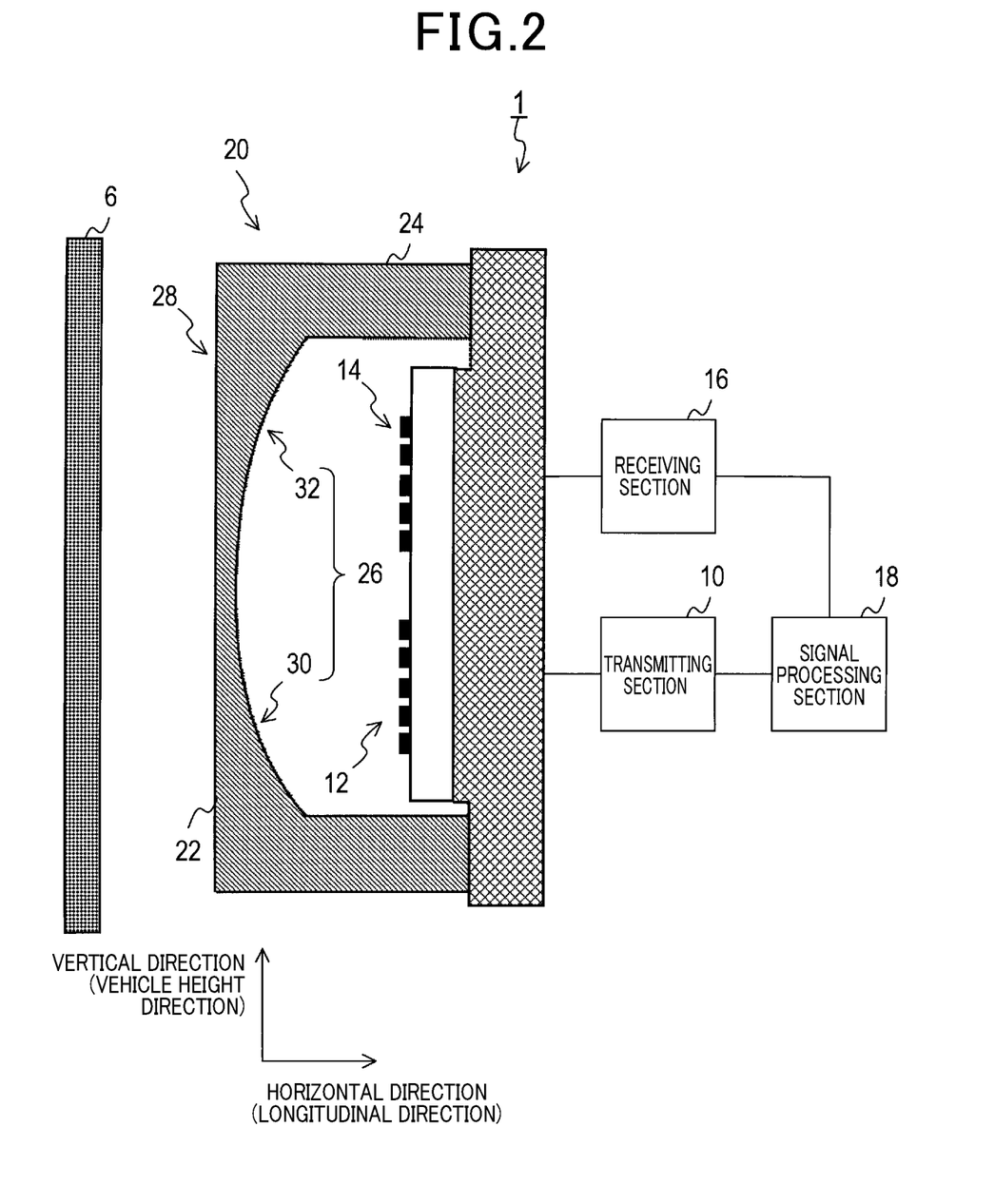
FIG. 2 is an explanatory diagram showing the general configuration of a first embodiment of a radar apparatus.

As shown in FIG. 2, the front of the radar apparatus 1 is covered by the bumper 6 provided on the 4-wheeled automobile 80. The bumper 6 is formed such as to be permeable to the probe waves.

The radar apparatus 1 includes a transmitting section 10, a transmitting antenna section 12, a receiving antenna section 14, a receiving section 16, a signal processing section 18, and a cover member 20.

The transmitting section 10 generates probe waves in accordance with signals from the signal processing section 18. The probe waves generated by the transmitting section 10 may be pulsed waves or a continuous wave. A continuous wave may be frequency modulated. In the case of applying frequency modulation, the modulation may be executed such that, along the time-axis, there are rising segments in which the frequency gradually increases and falling segments in which the frequency gradually decreases. That is, the radar apparatus 1 may be configured as pulse radar, CW (continuous wave) radar, FMCW (frequency modulated continuous wave) radar, or some other form of radar.

The transmitting antenna section 12 radiates the probe waves generated by the transmitting section 10. The transmitting antenna section 12 in this embodiment may have a single antenna element or a plurality of antenna elements.

The receiving antenna section 14 receives incoming waves. The "incoming waves" referred to here include probe waves radiated from the transmitting antenna section 12 and reflected by targets.

The receiving antenna section 14 of this embodiment may have a single antenna element or a plurality of antenna elements. The receiving antenna section 14 of this embodiment is located higher than the transmitting antenna section 12, with respect to the vehicle height direction (i.e., the vertical direction) of the four-wheel vehicle 80.

The receiving section 16 executes preprocessing of the incoming waves received by the receiving antenna section 14, as required for detecting targets. The preprocessing here includes sampling incoming waves, removing noise from incoming waves, etc.

The signal processing section 18 includes at least one known type of microcomputer. The signal processing section 18 detects a target by using a known type of processing, based on incoming waves that have been subjected to preprocessing in the receiving section 16, and on the probe waves generated by the transmitting section 10, and also calculates at least the distance to the target.

When the radar apparatus 1 is configured as a FMCW radar, the signal processing section 18 may be at least one calculation processing apparatus (for example a DSP: Digital Signal Processor) which executes FFT (Fast Fourier Transform) processing, etc., on the data from the receiving section 16.

<Cover Member>

The cover member 20 is what is called a radome, which covers the transmitting antenna section 12 and the receiving antenna section 14. The cover member 20 is made of a material that is permeable to electromagnetic waves (that is, the probe waves) in the millimeter-wave band, and is disposed facing the transmitting antenna section 12 and the receiving antenna section 14.

The cover member 20 has a cover center section 22 formed as a rectangular plate, and wall sections 24 extending upright in a common direction from the rim of the cover center section 22.

The cover center section 22 is formed with a first face 26 and a second face 28. The first face 26 is disposed facing the transmitting antenna section 12 and the receiving antenna section 14. The second face 28 is on an opposite side of the cover section 22 from the first face 26.

A transmitting opposing face 30 and a receiving opposing face 32 are formed on the first face 26. The transmitting opposing face 30 is located opposite the transmitting antenna section 12. The receiving opposing face 32 is disposed opposite the receiving antenna section 14. That is to say, the receiving opposing face 32 is formed at an upper side and the transmitting opposing face 30 is formed at a lower side, with respect to the height direction of the 4-wheel automobile 80 (i.e., the vertical direction).

The thickness at the transmitting opposing face 30, along the vehicle width direction (i.e., the horizontal direction) from the transmitting opposing face 30 to the second face 28 decreases in accordance with increased proximity to the upper side, with respect to the vertical direction, and increases in accordance with increased proximity to the lower side, with respect to the vertical direction.

Specifically, the transmitting opposing face 30 is formed with a curved second face along the vertical direction, with a prescribed radius of curvature. Based on results of tests and simulations, it has been found that the radius of curvature of the transmitting opposing face 30 should be determined such that probe waves which pass through cover member 20 and are refracted at the second face 28 will be radiated within a prescribed detection range. Furthermore the radius of curvature should be determined such as to reduce the extent to which reflected waves which are probe waves that are reflected by the cover member 20 will be directed towards the transmitting antenna section 12 and the receiving antenna section 14.

Figure 3:
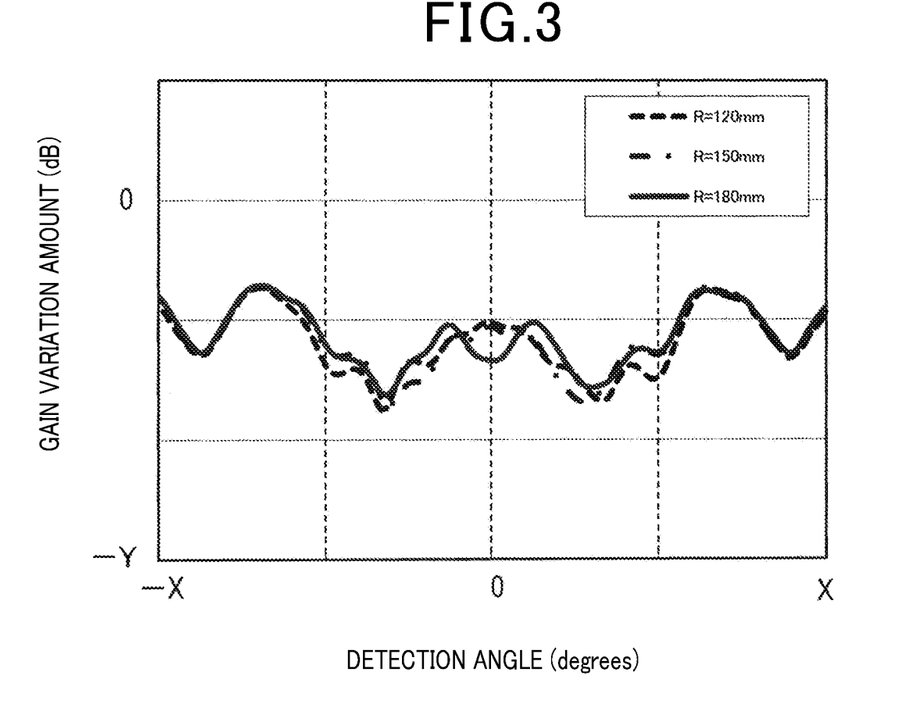
FIG. 3 is a graph showing the effects of examples of the radius of curvature of a transmitting opposing face in the first embodiment.

The radius of curvature of the transmitting opposing face 30 can be set, for example, within the range of 120 mm to 180 mm. The reason for this is that it has been learned, from results of simulations performed by the assignees of the present invention, as shown in FIG. 3, that if the radius of curvature of the transmitting opposing face 30 is within the range of 120 mm to 180 mm, the probe waves which pass through the cover member 20 will be radiated within the detection range, and interference with the probe waves that is caused by waves reflected from the cover member 20 can be held to within a desired extent.

The receiving opposing face 32 is a face that is continuous with the transmitting opposing face 30, but is not parallel to the transmitting opposing face 30. The thickness at positions on the receiving opposing face 32, along the horizontal direction from the receiving opposing face 32 to the second face 28, increases in accordance with increased proximity to the upper end, along the vertical direction, and decreases in accordance with increased proximity to the lower end, along the vertical direction.

Specifically, the receiving opposing face 32 is formed with a curved surface having a specified radius of curvature along the vertical direction. Based on results of simulations, it has been found that the reflection of probe waves from the cover member 20 to the radar apparatus 1 can be reduced, and the degree to which incoming waves from outside the detection range of targets become directed to the radar apparatus 1 can be reduced, by suitably determining the radius of curvature of the receiving opposing face 32.

The second face 28 is formed as a planar surface that is not parallel to the first face 26. With this embodiment, the planar surface of the second face 28 is parallel to the vertical direction.

The first face 26 and the second face 28 of this embodiment are each formed to have a uniform cross-section along the vehicle width direction of the 4-wheel automobile 80.

Action and Advantageous Effects of the First Embodiment

The radar apparatus 1 radiates probe waves from the transmitting antenna section 12.

In the cover member 20, these probe waves are successively refracted at the transmitting opposing face 30 of the first face 26 and at the second face 28. The probe waves which are then radiated from the second face 28 pass through the bumper 6, to arrive in the detection range ahead of the 4-wheel automobile 80. Reflected waves, which are reflected from targets within the detection range, are received as incoming waves by the receiving antenna section 14.

Based on these incoming waves and on the probe waves generated by the transmitting section 10, the signal processing section 18 detects each target that is a source of incoming waves, and obtains the distances to the respective targets. If the receiving antenna section 14 is formed with a plurality of antenna elements, then it is possible for the signal processing section 18 to derive respective directions in which the targets are present. Furthermore if the radar apparatus 1 is configured as a FMCW radar, the signal processing section 18 may obtain the relative speed of each target, in addition to measuring the distance to each target.

Probe waves from the radar apparatus 1 are reflected at the first face 26 and the second face 28 of the cover member 20. There is a danger that these reflected waves which are reflected at the first face 26 and the second face 28 may interfere with the probe waves, as noise.

However the first face 26 and the second face 28 of the cover member 20 are formed such as not to be parallel to one another. As a result, a decreased is achieved in the extent to which a first reflection noise that is reflected from the first face 26 and a second reflection noise that is reflected from the second face 28 are oriented in a same direction.

In particular, the transmitting opposing face 30 is formed as a curved face such that the closer to the upper end, along the vertical direction, the smaller becomes the thickness along the longitudinal direction of the 4-wheel automobile 80, (i.e., along the horizontal direction), and the closer to the lower end, along the vertical direction, the greater becomes the thickness along the horizontal direction. As a result, the closer the position to the lower end of the transmitting opposing face 30, the greater becomes the degree to which the reflected waves (reflected probe waves) become oriented in different directions to those of the transmitting antenna section 12 and the receiving antenna section 14.

Due to these facts, a reduction can be achieved in the condition whereby the first reflection noise and the second reflection noise become strengthened and cause interference with the probe waves that are transmitted by the radar apparatus 1 itself. That is to say, the radar apparatus 1 can reduce the effects of interference caused by reflection noise.

By reducing the effects of interference with the probe waves by the reflection noise in that way, the radar apparatus 1 can prevent a lowering of target detection accuracy.

Second Embodiment

The second embodiment of a radar apparatus differs from the first embodiment mainly with respect to the configuration of the cover member. Hence the configuration of the second embodiment will be described using the same reference signs as for the first embodiment, and the description is centered on points of difference from the first embodiment.

Figure 4:
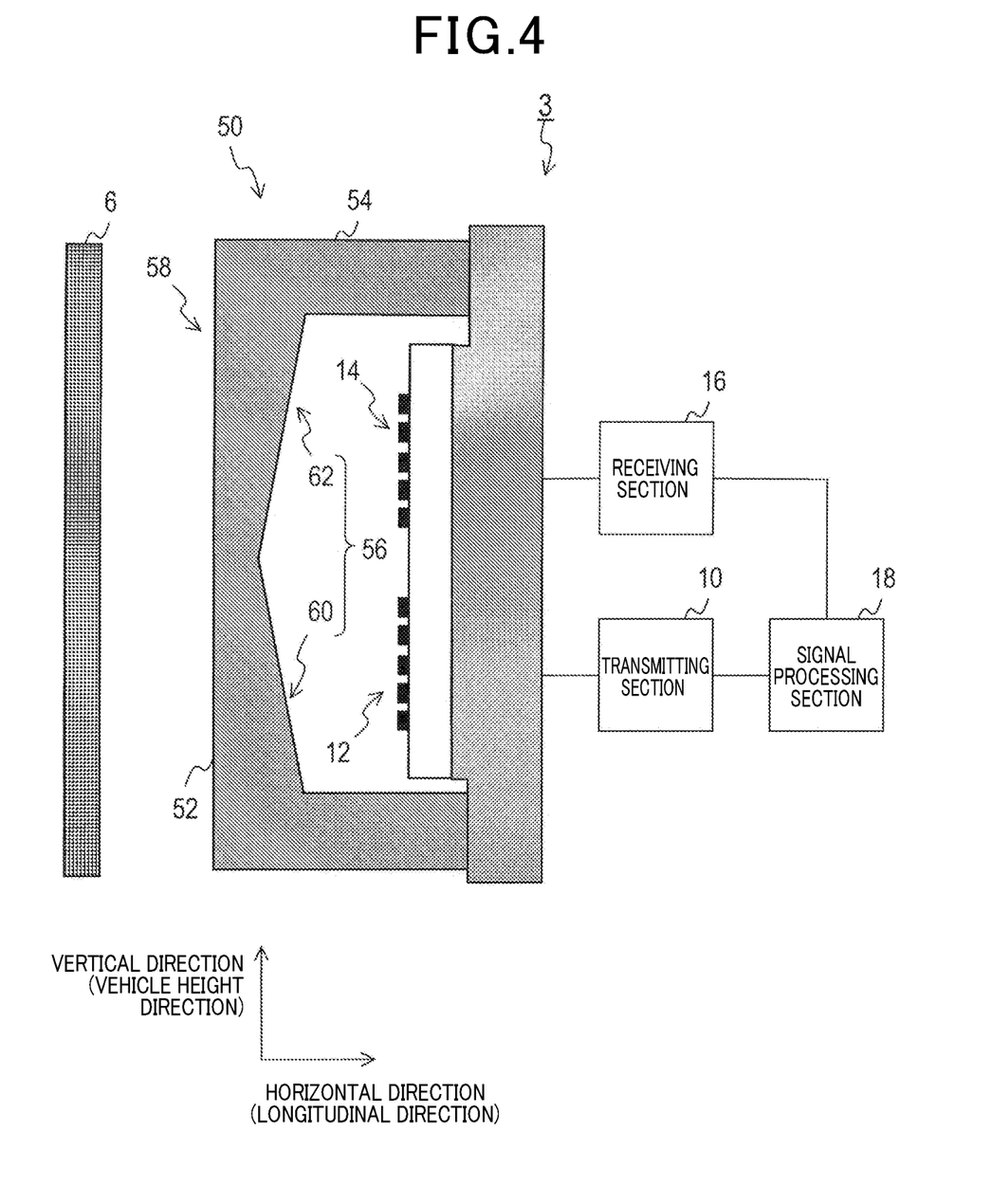
FIG. 4 is an explanatory diagram showing the general configuration of a second embodiment of a radar apparatus.

As shown in FIG. 4, the radar apparatus 3 of this embodiment includes a transmitting section 10, a transmitting antenna section 12, a receiving antenna section 14, a receiving section 16, a signal processing section 18, and a cover member 50.

<Cover Member>

The cover member 50 is what is known as a radome, which covers the transmitting antenna section 12 and the receiving antenna section 14. The cover member 50 of this embodiment is disposed facing the transmitting antenna section 52 and the receiving antenna section 54, and is formed of a material that is permeable to the probe waves.

The cover member 50 has a cover center section 52 formed as a rectangular plate, and wall sections 54 extending upright in a common direction from the rim of the cover center section 52.

The cover center section 52 is formed with a first face 56 and a second face 58. The first face 56 is disposed facing the cover center section 52 and the receiving antenna section 54. The second face 58 is on an opposite side of the cover section 52 from the first face 56.

A transmitting opposing face 60 and a receiving opposing face 62 are formed on the first face 56. The transmitting opposing face 60 is located opposite the cover center section 52. The receiving opposing face 62 is disposed opposite the wall section 54. That is to say, the receiving opposing face 62 is formed at an upper side and the transmitting opposing face 60 is formed at a lower side, with respect to the height direction of the 4-wheel automobile 80 (i.e., the vertical direction).

The thickness at the transmitting opposing face 60, along the vehicle width direction (i.e., the horizontal direction) from the transmitting opposing face 60 to the second face 58 decreases in accordance with increased proximity to the upper side, with respect to the vertical direction, and increases in accordance with increased proximity to the lower side, with respect to the vertical direction. Specifically, the transmitting opposing face 60 is formed as a planar face, which is inclined with respect to an axis along the vertical direction.

The angle of inclination θ of the transmitting opposing face 60, with respect to an axis parallel to the vertical direction, should be determined such as to reduce the degree to which reflected waves that are probe waves reflected by the cover member 50 become directed towards the transmitting antenna section 12 and the receiving antenna section 14. Furthermore it has been found, based on results from tests and simulations, that the angle of inclination θ of the transmitting opposing face 60 should be determined such that probe waves that pass through the cover member 50 and are refracted at the transmitting opposing face 60 and the second face 58 will be radiated into the detection range.

Figure 5:
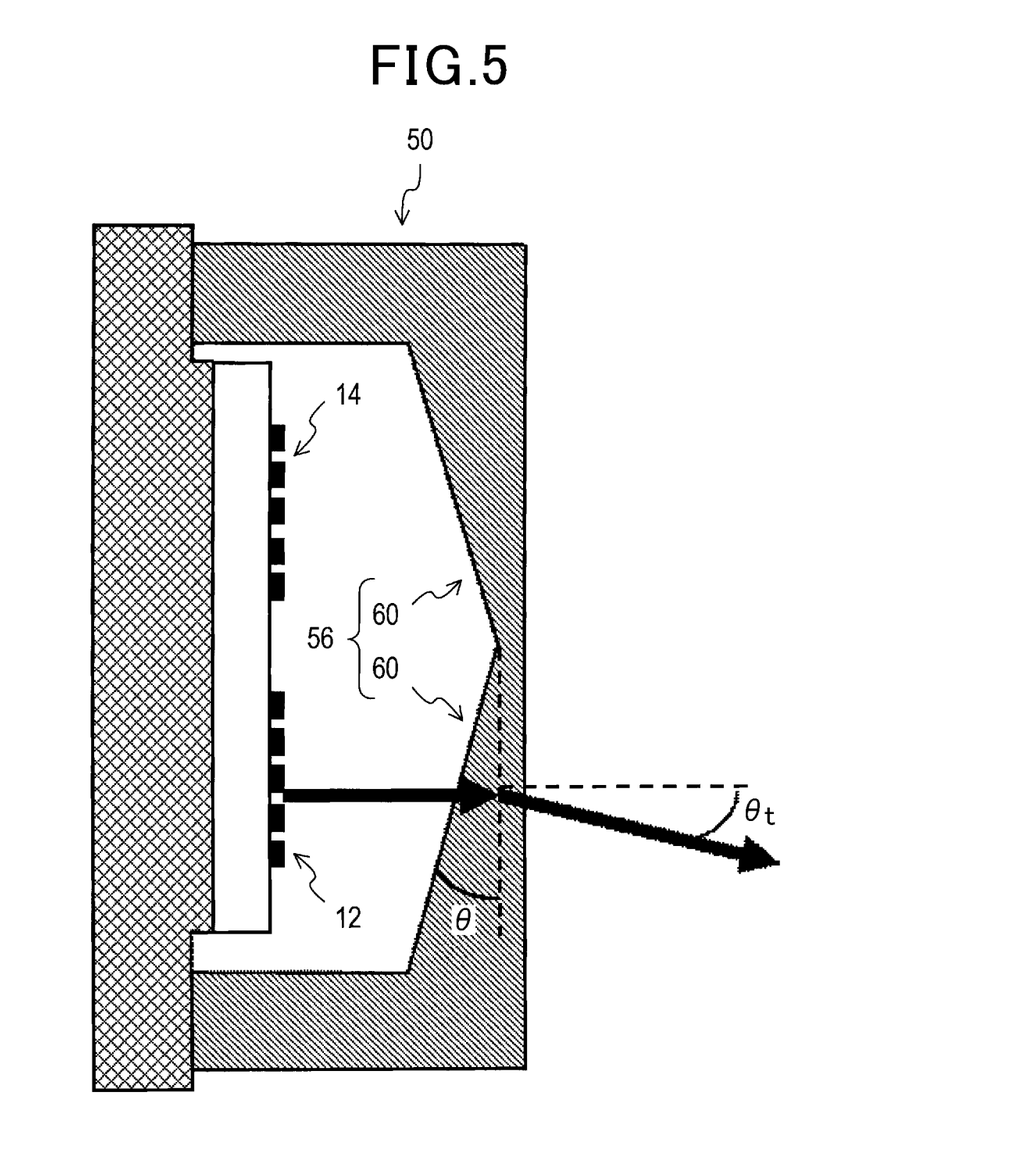
FIG. 5 is an explanatory diagram for describing an angle of inclination of the transmitting opposing face in the second embodiment.

Specifically, as shown in FIG. 5, the angle of inclination θ of the transmitting opposing face 60 is preferably determined based on equation (1) below such that the angle of inclination $θ_r$ of the probe waves, with respect to an axis along the horizontal direction, comes within the detection range.

[Math. 1]

$$\sqrt{\varepsilon}\,\sin(θ-A)=\sin θ_r \quad (1)$$

In equation (1), the symbol ε denotes the dielectric constant of the cover member 50.

Figure 6:
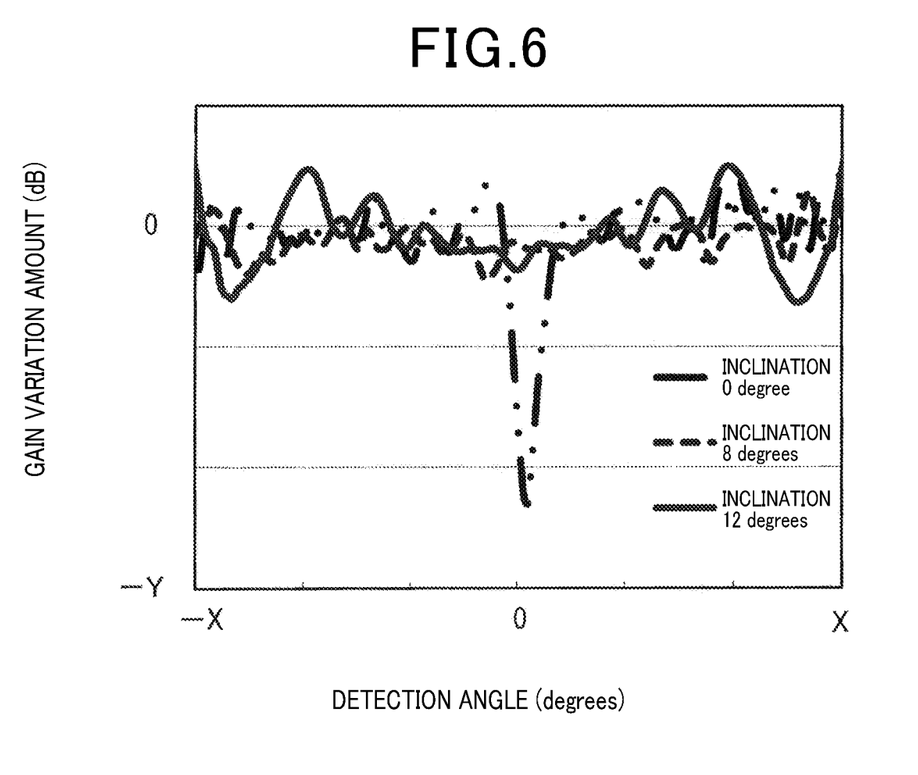
FIG. 6 is a graph showing the effects of examples of the angle of inclination of the transmitting opposing face in the second embodiment.

The angle of inclination θ of the transmitting opposing face 60 can for example be set within the range 9 degrees~12 degrees. The reason for this is that, as shown in FIG. 6, it has been learned as a result of experiments by the assignee of the present invention that when the angle of inclination θ is within the range 9 degrees~12 degrees, the probe waves which pass through the cover member 50 become radiated into the detection range, and interference with the probe waves by reflected waves from the cover member 50 can be held within a desired extent.

The receiving opposing face 62 is a face that is continuous with the transmitting opposing face 60, and is formed such as not to be parallel to the transmitting opposing face 60.

The receiving opposing face 62 is formed such that the thickness in the horizontal direction increases in accordance with increased proximity to the upper end, along the vertical direction, and decreases in accordance with increased proximity to the lower end, along the vertical direction. Specifically, the receiving opposing face 62 is formed as a planar face, which is inclined with respect to an axis along the vertical direction. It has been found based on results from simulations that the angle of inclination of the receiving opposing face 62 should be determined such as to reduce the reflection of probe waves from the cover member 50 to the radar apparatus 3, and to reduce the extent to which incoming waves from targets outside the detection range become directed towards the radar apparatus 3.

The second face 58 is formed as a planar surface that is not parallel to the first face 56. With this embodiment, the planar surface of the second face 58 is disposed parallel to the vertical direction.

The first face 56 and the second face 58 of the cover member 50 of this embodiment are formed to have a uniform cross-sections along the vehicle width direction of the 4-wheel automobile 80.

Advantageous Effects of the Second Embodiment

With the cover member 50 of this embodiment, as for the cover member 20 of the first embodiment, a reduction can be achieved in the degree to which the first reflection noise and the second reflection noise become strengthened and interfere with the probe waves that are transmitted by the radar apparatus 1 itself. That is, the radar apparatus 3 can provide a decrease in the effects of interference due to reflection noise.

Furthermore by reducing the effects of interference due to reflection noise in that way, the radar apparatus 3 can curtail a lowering of the accuracy of detecting targets.

Other Embodiments

The present disclosure has been described in the above referring to embodiments, but is not limited to these embodiments and can be implemented in various modes without departing from the spirit of the invention.

For example with the cover member 20 of the first embodiment, both the transmitting opposing face 30 and the receiving opposing face 32 are formed as curved surfaces, however it is only necessary that at least one of the transmitting opposing face and receiving opposing face is a curved surface. Furthermore with the second embodiment, both of the transmitting opposing face 60 and the receiving opposing face 62 are formed as planar surfaces, however it is only necessary that at least one of the transmitting opposing face and receiving opposing is a planar surface.

That is to say, with a cover member according to the present disclosure, so long as the transmitting opposing face and the receiving opposing face are not parallel to the second face, it is possible for them to be formed as planar or curved surfaces.

Furthermore with the embodiments described above, the installation location of the radar apparatus 1, 3 is in a forward part of the 4-wheeled automobile 80, however the present disclosure is not limited to this. That is to say, it would be equally possible for the radar apparatus to be installed in a side part of the 4-wheeled automobile 80, or in a rear part of the 4-wheeled automobile 80, or at some other location.

With the first and second embodiments described above, the front of the radar apparatus 1, 3 is covered by a bumper, however the present disclosure is not limited to this, and it would be equally possible for the bumper to be omitted. That is to say, it would be equally possible for the radar apparatus 1, 3 not to be covered by a bumper.

Furthermore with the first and second embodiments described above, the radar apparatus 1, 3 is installed in a 4-wheeled automobile 80. However a radar apparatus according to the present disclosure is not limited to installation in a 4-wheeled automobile 80, and it would be equally possible for it to be installed in any type of mobile body, i.e., a two-wheeled motor vehicle, a bicycle, a ship, an aircraft, etc.

Moreover with the first and second embodiments described above, probe waves consisting of electromagnetic waves in the millimeter-wave band are used, however it would be equally possible for the probe waves to be light waves. That is to say, it would be equally possible for a radar apparatus according to the present disclosure to be a laser radar apparatus.

Furthermore it would be equally possible for the probe waves to be sound waves. That is to say, it would be equally possible for a radar apparatus according to the present disclosure to be what is called a sonar apparatus.

The cover members 20, 50 of the first and second embodiments are disposed opposite both of the transmitting antenna section 12 and the receiving antenna section 14, such as to cover both of the transmitting antenna section 12 and the receiving antenna section 14, however it is only necessary for a cover member 20, 50 according to the present disclosure to be configured to cover at least one of the transmitting antenna section 12 and the receiving antenna section 14.

Furthermore, configurations in which parts of the above embodiments are omitted also constitute embodiments of the present disclosure. Moreover, configurations which appropriately combine modified forms of the above embodiments also constitute embodiments of the present disclosure. Furthermore, all modes which can be envisaged that do not depart from the spirit of the invention as set out in the wording of the claims also constitute embodiments of the present disclosure.

DESCRIPTION OF SIGNS 1, 3 . . . Radar apparatus 6 . . . Bumper 10 . . . Transmitting section 12 . . . Transmitting antenna section 14 . . . Receiving antenna section 16 . . . Receiving section 18 . . . Signal processing section 20, 50 . . . Cover member 22, 52 . . . Cover center section 24, 54 . . . Wall section 26, 56 . . . First face 28, 58 . . . Second face 30, 60 . . . Transmitting opposing face 32, 62 . . . Receiving opposing face 80 . . . Four-wheel automobile

The invention claimed is:

1. A radar apparatus mounted on a vehicle provided with a bumper covering a front side of the radar apparatus, the radar apparatus comprising:

transmitting means for transmitting probe waves;
receiving means for receiving incoming waves;
target detection means for detecting targets that are origins of the incoming waves, based on results of transmitting the probe waves and receiving the incoming waves; and
a cover member positioned opposite at least one of the transmitting means and the receiving means, such as to cover at least one of the transmitting means and the receiving means,
the cover member comprising:
a first face positioned to directly face the transmitting means and the receiving means; and
a second face positioned between the bumper and the first face, the second face being positioned opposite to the first face along a direction with which the probe waves pass through a portion of the cover member that is defined by the first face, the second face disposed to face the bumper and positioned a predetermined distance from the bumper, and the second face disposed to not be parallel to the first face,
wherein
the first face comprises a curved surface, and
the curved surface has a concave shape that is concave towards the transmitting means and the receiving means.

2. The radar apparatus according to claim 1, wherein the first face comprises:
a transmitting opposing face positioned opposite the transmitting means; and
a receiving opposing face positioned opposite the receiving means, wherein
the transmitting opposing face and the receiving opposing face are not parallel to one another.

3. The radar apparatus according to claim 2, wherein at least one of the transmitting opposing face and the receiving opposing face is a curved surface.

4. The radar apparatus according to claim 2, wherein at least one of the transmitting opposing face and the receiving opposing face is a planar surface.

5. The radar apparatus according to claim 2, wherein the radar apparatus is installed on a mobile body,
the transmitting means is positioned at a lower side than the receiving means, along a vertical direction of the mobile body, and
a thickness between the transmitting opposing face and the second face increases in accordance with increased proximity to the lower side, along the vertical direction.

6. A cover member provided in a radar apparatus mounted on a vehicle provided with a bumper covering a front side of the cover member, the radar apparatus comprising transmitting means for transmitting probe waves, receiving means for receiving incoming waves, and target detection means for detecting targets that are origins of the incoming waves, based on results of transmitting the probe waves and receiving the incoming waves, wherein the cover member is positioned opposite at least one of the transmitting means and the receiving means, so as to cover at least one of the transmitting means and the receiving means,
the cover member comprising:
a first face which directly faces the transmitting means and the receiving means; and
a second face positioned between the bumper and the first face, the second face being positioned opposite to the first face along a direction with which the probe waves pass through a portion of the cover member that is defined by the first face, the second face disposed to face the bumper and positioned a predetermined distance from the bumper, and the second face disposed to not be parallel to the first face,
wherein
the first face comprises a curved surface, and
the curved surface has a concave shape that is concave towards the transmitting means and the receiving means.

7. A radar apparatus mounted on a vehicle provided with a bumper covering a front side of the radar apparatus, the radar apparatus comprising:

transmitting means for transmitting probe waves;
receiving means for receiving incoming waves;
target detection means for detecting targets that are origins of the incoming waves, based on results of transmitting the probe waves and receiving the incoming waves; and
a cover member positioned opposite at least one of the transmitting means and the receiving means, such as to cover at least one of the transmitting means and the receiving means,
the cover member comprising:
a first face positioned to directly face the transmitting means and the receiving means; and
a second face positioned opposite to the first face along a direction with which the probe waves pass through a portion of the cover member that is defined by the first face, the second face disposed to face the bumper and positioned a predetermined distance from the bumper, and the second face disposed to not be parallel to the first face,
wherein
a gap is present between the second face and the bumper,
the first face comprises a curved surface, and
the curved surface has a concave shape that is concave towards the transmitting means and the receiving means.

8. The radar apparatus according to claim 7, wherein the first face comprises:

a transmitting opposing face positioned opposite the transmitting means; and a receiving opposing face positioned opposite the receiving means, wherein the transmitting opposing face and the receiving opposing face are not parallel to one another.

9. The radar apparatus according to claim 8, wherein at least one of the transmitting opposing face and the receiving opposing face is a curved surface.

10. The radar apparatus according to claim 8, wherein at least one of the transmitting opposing face and the receiving opposing face is a planar surface.

11. The radar apparatus according to claim 8, wherein the radar apparatus is installed on a mobile body, the transmitting means is positioned at a lower side than the receiving means, along a vertical direction of the mobile body, and a thickness between the transmitting opposing face and the second face increases in accordance with increased proximity to the lower side, along the vertical direction.

12. The radar apparatus according to claim 1, wherein the cover member is planar across the second face.

13. The radar apparatus according to claim 3, wherein the curved surface comprises a radius of curvature with respect to a vertical direction of the vehicle within a range of 120 mm to 180 mm.

14. The radar apparatus according to claim 4, wherein the planar surface is oriented at an inclination angle with respect to a horizontal direction of the vehicle within a range of 9 degrees to 12 degrees.

* * * * *